(12) United States Patent
Stevens et al.

(10) Patent No.: US 6,623,780 B1
(45) Date of Patent: Sep. 23, 2003

(54) AQUEOUS DISPERSIBLE STEROL PRODUCT

(75) Inventors: Luke Alan Stevens, Minneapolis, MN (US); Wade Nolan Schmelzer, Saint Louis Park, MN (US)

(73) Assignee: Cargill, Inc., Wayzata, MN (US)

( * ) Notice: Subject to any disclaimer, the term of this patent is extended or adjusted under 35 U.S.C. 154(b) by 14 days.

(21) Appl. No.: 10/107,111

(22) Filed: Mar. 26, 2002

(51) Int. Cl.7 .................................................. A23L 2/00
(52) U.S. Cl. ........................ 426/590; 426/601; 426/611; 426/599
(58) Field of Search ................................ 426/611, 601, 426/590, 599

(56) References Cited

U.S. PATENT DOCUMENTS

| | | | |
|---|---|---|---|
| 6,063,776 A | 5/2000 | Ostlund | 514/182 |
| 6,110,502 A | 8/2000 | Burruano et al. | 424/499 |
| 6,190,720 B1 | 2/2001 | Yuan et al. | 426/601 |
| 6,242,001 B1 | 6/2001 | Bruce et al. | 424/464 |
| 6,267,963 B1 | 7/2001 | Akashe et al. | 424/195.1 |
| 6,267,985 B1 * | 7/2001 | Chen et al. | 424/451 |
| 6,274,574 B1 | 8/2001 | Akashe et al. | 514/182 |
| 6,294,186 B1 * | 9/2001 | Beerse et al. | 424/405 |
| 6,352,737 B1 | 3/2002 | Dolhaine et al. | 426/611 |
| 6,451,339 B2 * | 9/2002 | Patel et al. | 424/451 |
| 2001/0006672 A1 | 7/2001 | Akashe et al. | 424/439 |
| 2001/0012521 A1 | 8/2001 | Bruce et al. | 424/484 |

FOREIGN PATENT DOCUMENTS

| | | | |
|---|---|---|---|
| AU | 200037866 A1 | 6/2000 | ............ A01F/17/36 |
| CA | 2310502 | 6/2000 | ............... C07J/9/00 |
| EP | 0 947 197 A1 | 6/1999 | ......... A61K/31/575 |
| EP | 1 005 859 A1 | 7/2000 | ............. A61K/9/14 |
| JP | 6-329588 | 11/1994 | ........... C07C/69/30 |
| WO | WO 99/39715 | 8/1999 | .......... A61K/31/56 |
| WO | WO 99/56729 | 11/1999 | ............. A61K/9/14 |
| WO | WO 99/59423 | 11/1999 | ............. A23D/9/00 |
| WO | WO 99/63841 | 12/1999 | ............. A23L/1/03 |
| WO | WO 00/33669 | 6/2000 | ............. A23L/1/29 |
| WO | WO 00/41491 | 7/2000 | |
| WO | WO 00/50007 | 8/2000 | .......... A61K/9/127 |
| WO | WO 01/32031 A2 | 5/2001 | ............. A23L/1/00 |
| WO | WO 01/32036 A1 | 5/2001 | ............. A23L/1/30 |
| WO | WO 01/37681 A1 | 5/2001 | ............. A23L/1/30 |
| WO | WO 02/28204 A1 | 4/2002 | ............. A23L/2/38 |

* cited by examiner

Primary Examiner—Carolyn Paden
(74) Attorney, Agent, or Firm—Jeff Skelton

(57) ABSTRACT

The present invention relates to a water dispersible sterol product that can be used in food and/or dietary supplements. The product of the invention is particularly useful for beverage applications and yields a product with small particle size and favorable organoleptic properties

25 Claims, No Drawings

AQUEOUS DISPERSIBLE STEROL PRODUCT

FIELD OF INVENTION

The present invention relates to a novel composition for delivery of sterols for use in food and dietary supplement applications.

BACKGROUND OF THE INVENTION

Coronary heart disease (CHD) is a common and serious form of cardiovascular disease that causes more deaths in the U.S. every year than any other disease. High serum cholesterol, and especially high levels of low density lipoprotein (LDL) cholesterol, are risk factors associated with CHD. Research has shown that consumption of plant sterols may lower total and LDL cholesterol and thereby reduce the risk of CHD.

One way that individuals can get more sterols into their diet is by consuming fortified or "functional" foods. A primary drawback to the use of plant sterols is their poor water solubility due to their hydrophobic nature. There have been numerous efforts to overcome this shortcoming such as esterifying sterols with fatty acids to render a product suitable for fat-based uses. The FDA has recently authorized labeling sterol fortified foods with a health claims about the role of plant sterol esters in reducing the risk of CHD. Producers may advertise that foods containing at least 0.65 g of plant sterol esters per serving, eaten twice a day with meals for a daily total intake of at least 1.3 g (or 1.7 g of stanol esters twice a day for a total of 3.4 g), as part of a diet low in saturated fat and cholesterol, may reduce the risk of heart disease. Because sterol esters are fat soluble hydrophobic ingredients they have been typically incorporated in fat based foods such as margarine, spread, salad dressing, and mayonnaise. While this approach is a technical solution to formulating the ingredient, it is contradictory and confusing to cholesterol-conscious consumers who are trying to reduce the amount of fat in their diets.

The incorporation of free sterols into aqueous systems has been a challenge due to the hydrophobic nature of free sterols. The literature describes various methods of incorporating sterols into water by either chemical modification or mixing with various emulsifiers. Numerous practitioners have proposed solutions for aqueous formulation, however, many of these solutions have inherent problems of their own including: the cost of chemical modification, the ineffectiveness of the products, the cost and/or food safety concerns of mixing through the use of organic solvents, poor stability, subsequent flocculation, and poor textural or flavor properties. The present invention is directed toward a novel formulation of plant sterols which provides for their use in aqueous systems and overcomes many of the problems with alternative aqueous formulations. The present invention does not require any solvents or drying steps, uses only readily available food materials, and uses methods and equipment common to the food and beverage application industry.

SUMMARY OF THE INVENTION

The present invention has the advantage of producing a sterol product which is easily dispersed into water, can be produced using traditional and inexpensive processing techniques, and uses readily available and inexpensive emulsifiers. The process does not involve the use of organic solvents or water and therefore does not involve expensive solvent removal or drying operations. In addition, in comparison to other products made using a solvent free process, the current invention provides a much lower particle size. This product is easier to disperse in aqueous systems, results in the sterols being more stable, and has minimal impact on the sensory characteristics of the end formulation. The specific emulsifiers and/or amounts of these emulsifiers used are less expensive, readily available, food compatible, and may be more effective than demonstrated in the prior art.

The present invention entails a composition comprising: a sterol, a monoglyceride, and a polysorbate wherein the sterol, monoglyceride, and polysorbate are present in a weight ratio of i) one part sterol, to ii) about 1.14 to about 1.5 parts monoglyceride, to iii) about 0.04 to about 0.20 parts polysorbate;

and wherein upon distribution in water the composition yield particles, and wherein greater than 90% of the particles are smaller than one micron.

The present invention further describes a process of preparing an aqueous beverage comprising the steps of:

a) forming a homogeneous melt solution of sterols with a monoglyceride by heating to yield a mixture;

b) rapidly cooling the mixture such that no or minimal separation of the sterols from the emulsifier mix occurs to yield a powder;

c) mixing the powder with water or an aqueous food application;

d) Heating the water or aqueous food application to above the melting temperature of the mixture to yield an aqueous matrix; and e) Mixing the aqueous matrix under high shear at a temperature above the melting point of the mixture.

DETAILED DESCRIPTION OF THE INVENTION

The term "sterol" as used herein means both specific sterols such as: sitosterol, campesterol, stigmasterol, brassicasterol, avenasterols, and diosgenin, or mixtures of specific sterols. The specific sterols or mixtures of sterols or sterol derivatives may be isolated from the following sources: oilseeds such as soybeans, canola seed, corn, sunflower, cottonseed, palm kernel, corn fiber, soy germ, sheanut, or peanut; tree sources such as tall oil, tall oil soap or tall oil pitch; other plant sources such as Mexican yam, olives, or sugar cane. Also included within the definition of sterols are hydrogenated forms of the above mentioned sterols (known in the art as stanols) including but not limited to sitostanol and campestanol. Further included within this definition are sterol ester derivatives such as: steryl or stanol fatty acid esters, ferulate esters, or succinate esters. Also included within this definition are sterol based pharmaceuticals and pharmaceutical intermediates such as estron, estrogen, progesterone, testosterol, androstenedione, androstene-diene-dione. Mixtures of all of various sterols are also within the scope of the current invention.

The term "monoglyceride" as used herein means single fatty acid esters of glycerol. The fatty acid portion of the monoglyceride may come from any source and be of varied length and degree of saturation. Common sources include natural oils such as soybean, canola, sunflower, palm, and the like. The fatty acid portion may often be a mixture of various lengths and degrees of saturation. The monoglyceride may unavoidably contain a fraction of diglycerides or triglycerides as impurities. Preferably the monoglyceride is distilled to lower the impurity level. Most preferred monoglycerides for the present invention are those having a melting point above 15° C. more preferably above 35° C. or above 50° C. Most preferably the monoglyceride is comprised of substantially fully saturated C18 fatty acids.

The term "polysorbate" as used herein means polyoxyethylene sorbitan esters. Polysorbates preferred in the present invention are polysorbate 60, polysorbate 65, and polysorbate 80. Most preferred is polysorbate 60 (polyoxyethylene(20)sorbitan monosterate).

The primary difficulty in formulating sterols is their high melting point. Commercially available food grade sterols typically have a melting point range of 120° C.–140° C. This makes their dispersion in water very difficult because the sterols cannot be dispersed in water as liquid sterols without resorting to high temperatures and associated high pressures. The result of mixing solid sterols with water is that the particle size of the sterols remains substantially the same as the particle size of the input sterols. Even finely ground sterols would have a particle size significantly greater than what is obtained by the present invention.

The current invention overcomes this problem by mixing the sterols with monoglycerides or other medium polarity emulsifiers. Monoglycerides are surprisingly effective at dissolving sterols at reasonable temperatures. A mixture of 1 part sterols and 1.25 parts monoglycerides which is melt mixed and spray prilled results in a powder which melts at ~70° C. with only a very minor portion of the mixture remaining solid until ~95° C. It was even more surprising to find that the addition of only a minor amount (1–4 wt %) of polysorbate (such as Tween 60) further increased this effect such that the total melting temperature was approximately 75° C.

The powder of sterols and monoglycerides and polysorbate is made by heating the components to form a virtually or completely homogeneous melt solution. The melt is then cooled very rapidly such that substantial separation of the sterols does not take place. It has been found that operations such as spray prilling or spray microprilling are effective. In these cases the melt is atomized into a flow of air allowing for very fast cooling of the melt resulting in a flowable powder. It is advantageous to use a monoglyceride which is solid at room temperatures or slightly elevated temperatures. This facilitates the formation of a free flowing powder upon spray prilling. Saturated monoglycerides such as Dimodan PVK (Danisco) were preferred. When the emulsifier blend containing the medium polarity emulsifier, sterols, and optionally other emulsifiers, is melted and cooled to a powder, it is important to utilize methods which do not result in substantial separation of the emulsifier and the sterol. To ensure that significant separation does not occur the melt should be cooled as rapidly as is practical using normal equipment. The described method using microprilling, where the melt is atomized into an air stream, resulting in the rapid formation of the powder is preferred. Alternative methods may include prilling, the formation of pastilles, extrusion, or other suitable methods optionally followed by grinding may also be used.

The sterols/emulsifier powder can be formulated by addition to water or an aqueous application with mixing to form a slurry. The mixture is then heated such that the powder melts into a liquid or semi-liquid within the aqueous application. The mixture of the melt and the aqueous application is then subjected to a shearing operation, such as homogenization. The temperature is maintained during shearing above the melting point of the sterols/emulsifier powder. A continuous system consisting of a heat exchanger (or pasteurizer) and an in line homogenizer may be used to minimize the time of exposure of the product to elevated temperatures.

The heating and shearing processes result in the formation of a fine liquid/liquid dispersion. Using this method a mean particle size of 358 nm can be obtained and virtually 100%, or substantially all of the particles are smaller than 1 micron. It is preferable that greater than 90% of the dispersed particles are smaller than 1 micron, and more preferable that greater than 95% of the dispersed particles are smaller than 1 micron. The temperature of the shearing operation must be above the melting point of the powder in the application. If the shearing is done at a temperature below the melting point of the powder the operation will not be one of shearing a liquid into fine droplets but rather the grinding of a powder into smaller particles. Shearing of a liquid is much more effective than grinding of a powder and the resulting particle size is much lower for the temperature above the melting temperature of the powder than for below the melting temperature.

It has been found that a dispersion made using the above methods containing sterols, monoglycerides, and polysorbate will be stable in pure water for a number of weeks. This may be sufficient for a number of applications but other applications may require the addition of stabilizers due to the conditions of the application or the requirement for a longer shelf life. One product which can be used to stabilize the dispersion is lecithin. The lecithin (preferably a hydroxylated deoiled lecithin) may be added to the emulsifier/sterol melt prior to cooling, may be added as a dry mixture to the spray prilled powder, or added separately to the aqueous application prior to mixing or homogenization. Other emulsifiers can be added during the melt preparation, to the dry powder, or included during preparation of aqueous formulation. Preferred additional emulsifiers include those that raise the zeta potential of the dispersed product.

Preferred beverages for use of the composition of the present invention are sports drinks, dairy drink, carbonated beverages, juices, artificial juices, and flavored waters.

The emulsified sterols of the present invention can also be added to non-beverage food applications such as yogurt, dairy products such as ice cream and cheese, cereals, bars, bread, spreads, sauces, dressings, confections, oils, crackers, baked goods, frozen foods, and the like. The powered product can be added simply during the course of typical manufacturing.

The ratio of the various components of the present invention are important to achieve the full benefit of the invention. All ratios described herein are based on weight and relative to the sterols utilized. Therefore, the sterol component will always be represented as 1.0. The ratio of monoglyceride and polysorbate utilized has a dramatic effect on the particle size of the product when it is formulated in a beverage application.

It should be understood that the use of the term "about" throughout this document reflects a degree of flexibility in the value identified if the value can be adjusted while still achieving the advantages of the invention. The present invention also includes the specific ranges and values that could be identified by removing the "about" designation.

When utilized in the present invention the monoglycerides are preferably present in a ratio to sterols of about 1.14 to about 1.50. More preferably about 1.14 to about 1.40, and most preferably about 1.17 to about 1.25. In addition, they may be present in specifically about 1.17, 1.20, 1.25, or 1.30.

When utilized in the present invention the polysorbates are preferably present in a ratio to sterols of about 0.04 to about 0.20. More preferably about 0.06 to about 0.1 and most preferably about 0.08.

The desired effect of lowering the melting point of the sterols may be achieved using a number of emulsifiers and a range of ratios as described above. The main objective is to lower the melting point of the sterol mixture to a level such that it can be sheared as a liquid in water as opposed to a solid in water. The range of desired melting points may range from approximately 30–120° C., preferably 40–100° C., and most preferably 60–80° C.

Optionally, crystal inhibitors may added to the formulation to increase the stability of the dispersed product by preventing or delaying the formation of crystals within the dispersion. Examples of suitable crystal inhibitors include polyglycerol esters, oxystearin, sucrose esters, glucose esters and sorbitan tristearate.

The present invention also includes a process for inclusion of emulisified sterols into beverages. The process involves the following steps:
1. Forming a homogeneous melt solution of sterols with a medium polarity emulsifier or mix of emulsifiers by heating.
2. Rapidly cooling the mixture such that no or minimal separation of sterols from the emulsifier mix occurs.
3. Optionally dry blending the resulting powder with additional emulsifiers.
4. Mixing the powder or powder blend with water or an aqueous food application.
5. Heating the water or aqueous food application to above the melting temperature of the original sterol powder.
6. Mixing under high shear (such as homogenization) at a temperature above the melting point of the original powder in an aqueous environment.

EXAMPLES AND PREPARATIONS

Example 1

Soybean sterols (1.5 kg, Cargill, Inc.), saturated monoglycerides (1.891 kg, Dimodan PVK, Danisco-Cultor), and Polysorbate 60 (0.141 kg, Tween 60—Unichema) were dry blended and melted in a 2 gallon pressure reactor (Parr) at 145° C. under nitrogen. The resulting solution was atomized at 400 psi through a standard spray drying nozzle into an air stream. The atomization was done into a spray dryer equipped with a cyclone for product recovery. The resulting product was a white to off-white fine free flowing powder.

Examples 2–3

The method of Example 1 was repeated using different levels of saturated monoglyceride and polysorbate 60. The ratios of materials used are described in the below table. All resulted in fine free flowing powders.

| Raw material ratios | | | |
|---|---|---|---|
| Example # | Sterols | Dimondan PVK | Tween 60 |
| 1 | 1 | 1.25 | 0.09 |
| 2 | 1 | 1.26 | 0.06 |
| 3 | 1 | 1.17 | 0.08 |

Examples 4–6

The powders produced in examples 1–3 were incorporated into water and the particle size of the resulting dispersions were measured. The procedure used for the incorporation into water involved addition of the powder under high-shear mixing to 80° C. water. The resulting slurry was allowed to cool to 50° C. The aqueous dispersions were then heated to 85° C. using a continuous pasteurization system (Microthermics, Inc., UHT\HTST hybrid), and subsequently homogenized on a two-stage homogenizer (Niro, Inc) at 3000 psi and 500 psi, respectively. The aqueous dispersions, containing 0.20% (w/w) sterols, were hot-filled into glass bottles, then rapidly cooled to room temperature. The particle size of these dispersions were measured using a Horiba LA-910 laser light scattering particle size analyzer using no sonication.

The product amounts and resulting particle sizes obtained are described in the following table.

| Example # | Powder from Example # | Powder loading (wt % in water) | Median Particle Size (micron) | % particles <1 micron | 95% of particles below (micron) |
|---|---|---|---|---|---|
| 4 | 1 | 0.47 | 0.3 | 96 | 0.77 |
| 5 | 2 | 0.46 | 0.4 | 99.8 | 0.77 |
| 6 | 3 | 0.46 | 0.4 | 94.5 | 1.3 |

Example 7

The product from Example 1 (23.5 grams) was slurried with water (4037.6 grams) at 80° C. and allowed to cool to 50° C. The dispersion was mixed with low pulp orange juice concentrate (938.9 grams Cargill, Inc.). The reconstituted juice was heated to 185° C. using a continuous pasteurization system (Microthermics, Inc., UHT\HTST hybrid), and subsequently homogenized on a two-stage homogenizer (Niro, Inc) at 3000 psi and 500 psi, respectively. The sterol containing orange juice was then hot filled into 12 fl. oz. (360 ml) glass bottles and rapidly cooled to room temperature. For comparison, a control product of orange juice from concentrate was prepared using the same procedures. The appearance, stability and settling characteristics of these products were monitored at room and refrigeration temperatures.

Example 8

The powder produced in Example 1 was dry mixed with lecithin (Precept 8120—Central Soya) such that the total mixture was 9% lecithin. The mixture was then formulated into water using the method of examples 4–6. The resulting dispersion was found to have a zeta potential of 5.5 mV at a pH of 7.94. The dispersion produced in Example 1 without lecithin had a zeta potential of 1.3 mV at a pH of 7.62.

The flavor and mouth feel of the sterol containing orange juice was identical to the control orange juice. Observation of settling characteristics indicated that the sterol-containing orange juice showed a lesser degree of pulp settling as compared to the control orange juice and displayed no discemable precipitation or flocculation of the sterol product.

The above specification, examples and data provide a complete description of the manufacture and use of the product of the invention. Since many embodiments of the invention can be made without departing from the spirit and scope of the invention, the invention resides in the claims hereinafter appended.

We claim:

1. A composition comprising: a sterol, a monoglyceride, and a polysorbate wherein the sterol, monoglyceride, and polysorbate are present in a weight ratio of
   i) one part sterol, to
   ii) about 1.14 to about 1.5 parts monoglyceride, to
   iii) about 0.04 to about 0.20 parts polysorbate;
      and wherein upon distribution in water the composition yield particles, and wherein greater than 90% of the particles are smaller than one micron.

2. The composition of claim 1 wherein the ratio of sterol to monoglyceride is 1 part sterol to about 1.18 to about 1.40 parts monoglyceride.

3. The composition of claim 2 wherein the ratio of sterol to monoglyceride is 1 part sterol to about 1.2 to about 1.3 parts monoglyceride.

4. The composition of claim 3 wherein the ratio of sterol to monoglyceride is 1 part sterol to about 1.25 parts monoglyceride.

5. The composition of claim 1 wherein the ratio of sterol to polysorbate is 1 part sterol to about 0.06 to about 0.1 parts polysorbate.

6. The composition of claim 5 wherein the ratio of sterol to polysorbate is 1 part sterol to about 0.08 parts polysorbate.

7. The composition of claim 1 wherein the monoglyceride has a melting point greater than 25° C.

8. The composition of claim 1 wherein the monoglyceride has a melting point greater than 50° C.

9. The composition of claim 1 wherein the monoglyceride is comprised substantially of fully saturated C18 fatty acids.

10. The composition of claim 1 wherein the polysorbate is selected from the group consisting of polysorbate 60, polysorbate 65, and polysorbate 80; or mixtures thereof.

11. The composition of claim 1 wherein the polysorbate is polysorbate 60.

12. The composition of claim 1 wherein:
   i) the ratio of sterol to monoglyceride is 1 part sterol to about 1.25 parts monoglyceride;
   ii) the ratio of sterol to polysorbate is 1 part sterol to about 0.08 parts polysorbate;
   iii) the monoglyceride has a melting point greater than 50° C.; and
   iv) the polysorbate is polysorbate 60.

13. The composition of claim 12 wherein the monoglyceride is comprised substantially of fully saturated C18 fatty acids.

14. The composition of claim 12 further comprising lecithin.

15. A process of preparing an aqueous beverage comprising the steps of:
   a) forming a homogeneous melt solution of sterols with a monoglyceride by heating to yield a mixture;
   b) rapidly cooling the mixture such that no or minimal separation of the sterols from the emulsifier mix occurs to yield a powder;
   c) mixing the powder with water or an aqueous food application;
   d) Heating the water or aqueous food application to above the melting temperature of the mixture to yield an aqueous matrix; and
   e) Mixing the aqueous matrix under high shear at a temperature above the melting point of the mixture.

16. The process of claim 15 further comprising additional emulsifiers being added to the powder or mixture.

17. The process of claim 15 wherein the mixture comprises: a sterol, a monoglyceride, and a polysorbate wherein the sterol, monoglyceride, and polysorbate are present in a weight ratio of
   i) one part sterol, to
   ii) about 1.14 to about 1.5 parts monoglyceride, to
   iii) about 0.04 to about 0.10 parts polysorbate.

18. The process of claim 17 wherein:
   i) the ratio of sterol to monoglyceride is 1 part sterol to about 1.25 parts monoglyceride;
   ii) the ratio of sterol to polysorbate is 1 part sterol to about 0.08 parts polysorbate;
   iii) the monoglyceride has a melting point greater than 25° C.; and
   iv) the polysorbate is polysorbate 60.

19. A food product prepared from the composition of claim 1.

20. A food product prepared from the composition of claim 12.

21. A beverage prepared from the composition of claim 1.

22. A beverage prepared from the composition of claim 12.

23. The beverage of claim 21 that is a juice.

24. The beverage of claim 22 that is orange juice.

25. The beverage of claim 21 that is a sports drink.

* * * * *